No. 649,263. Patented May 8, 1900.
H. TESSEYMAN.
BRAKE MECHANISM FOR CAR TRUCKS.
(Application filed Jan. 20, 1900.)
(No Model.) 2 Sheets—Sheet 1.
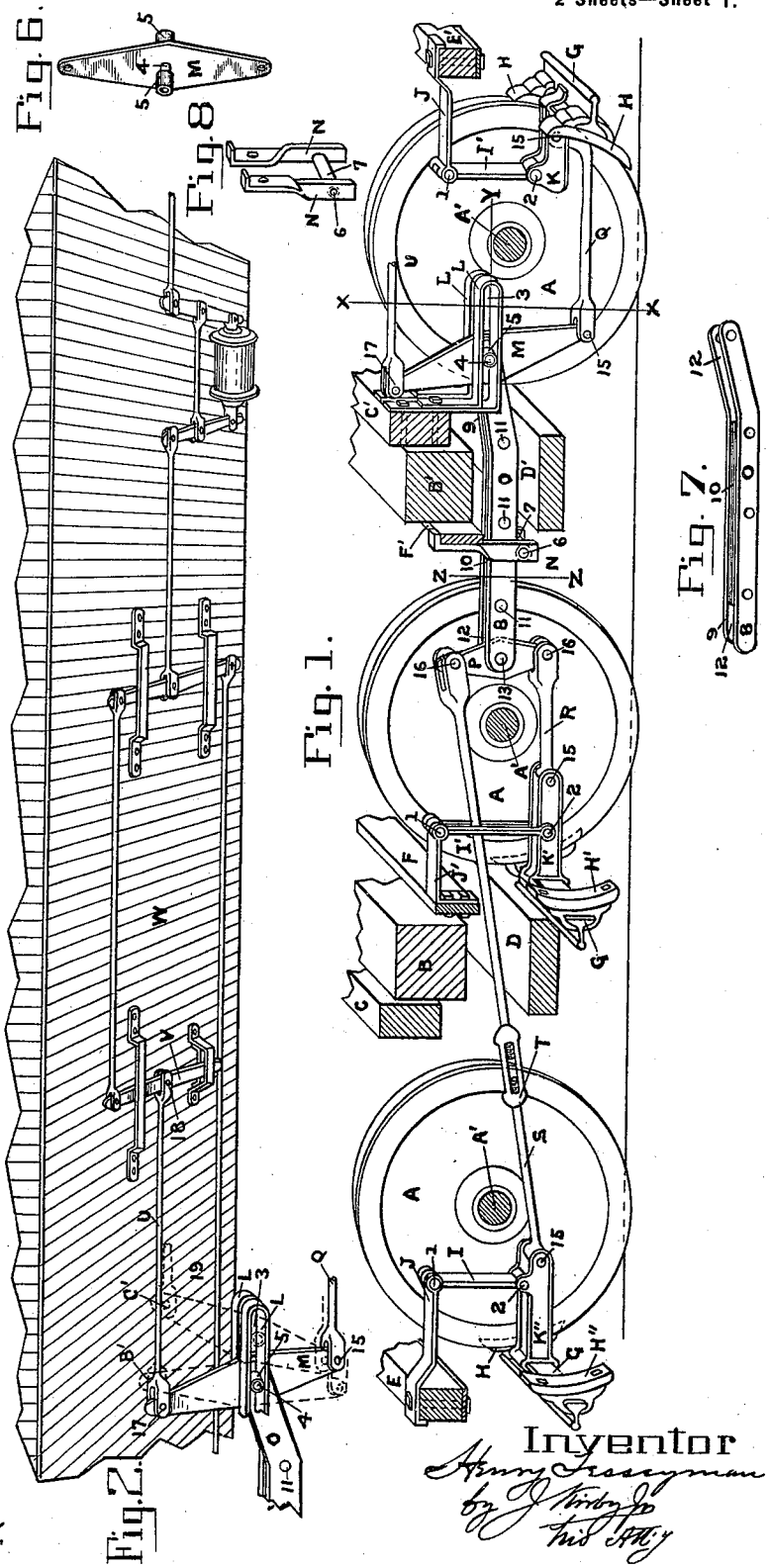
Attest:
E. B. Lehman
Fred E. Keeley
Inventor
Henry Tesseyman
by J. Kirby Jr.
His Atty No. 649,263. Patented May 8, 1900.
H. TESSEYMAN.
BRAKE MECHANISM FOR CAR TRUCKS.
(Application filed Jan. 20, 1900.)
(No Model.) 2 Sheets—Sheet 2.

Attest
E. B. Lehman
Fred E. Keeley

Inventor
Henry Tesseyman
by [his Atty]

UNITED STATES PATENT OFFICE.

HENRY TESSEYMAN, OF DAYTON, OHIO, ASSIGNOR TO THE BARNEY & SMITH CAR COMPANY, OF SAME PLACE.

BRAKE MECHANISM FOR CAR-TRUCKS.

SPECIFICATION forming part of Letters Patent No. 649,263, dated May 8, 1900.

Application filed January 20, 1900. Serial No. 2,103. (No model.)

*To all whom it may concern:*

Be it known that I, HENRY TESSEYMAN, a citizen of the United States, residing at Dayton, in the county of Montgomery and State of Ohio, have invented certain new and useful Improvements in Brake Mechanism for Car-Trucks; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

My invention relates to brake mechanism for car-trucks, more particularly to trucks of six-wheel type; and it has for its object to provide an improved yet inexpensive form of brake mechanism simple in construction, efficient in operation, and whose application to trucks will not be interfered with by the truck-transoms or other parts of the truck or car. The manner in which I accomplish the said object, together with details of construction and arrangement of parts, being shown in the accompanying drawings, forming a part hereof, and being hereinafter fully described and pointed out in the claims at the end of this specification.

Figure 3:
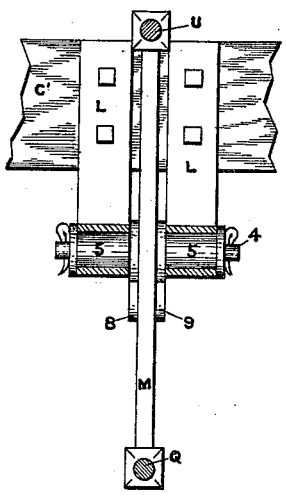
Figure 4:
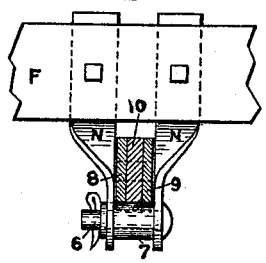
Figure 5:
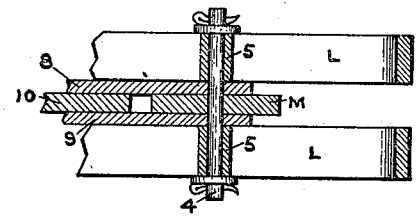

Figure 1 is a perspective view showing a portion of a six-wheeled car-truck with my improved brake mechanism applied thereto and in which the three wheels at the front side are removed, the truck-timbers cut through a line just forward of the center horizontal line of the truck, and the brake-beams and brake-shoes shown in full; Fig. 2, a perspective view underneath the car-body, showing a system of rods and levers at one end of a car and an air-cylinder at the center thereof, by which power is applied either by hand or by air-pressure to the brake mechanism; Fig. 3, a vertical section through line X X of Fig. 1 looking to the left; Fig. 4, a vertical section through line Z Z of Fig. 1 looking to the right; Fig. 5, a horizontal section through line Y of Fig. 1; Fig. 6, a perspective view of the live-lever and rollers; Fig. 7, a perspective view of the traveling connecting-bar; Fig. 8, a perspective view of the connecting-bar hanger and roller.

A serious objection to other forms of brake mechanism with which I am familiar is the difficulty experienced in attaching the same to the trucks and making the necessary connections to the car-body on account of the bolsters, transoms, and other appurtenances which interfere therewith. My invention contemplates the avoidance of this difficulty and constitutes a more reliable and easier-operating mechanism than has heretofore been employed.

Referring to the drawings, similar letters and numerals indicate like parts throughout all the figures thereof.

A represents the wheels, and A' the axles. B B' are the truck-bolsters; C C', the truck-transoms; D D', the spring-planks; E E', the end sills, and F F' the cross-beams of the truck and which form a part of the framework thereof.

G represents brake-beams, one of which extends across the truck at each pair of wheels and which carry brake-shoes H H' H'', which when the brakes are at rest are held clear of the wheels by releasing-springs (not shown) in the customary manner. The outer or end brake-beams are carried by the end sills, the intermediate one being carried by the cross-beam F and they are supported therefrom by suspension-hangers I I', which are pivotally connected at 1 to horizontally-disposed arms J J', preferably secured to the said end sills and cross-beam, as shown, the brake-beams being pivotally connected at 2 to the lower ends of said suspension-hangers through the medium of horizontally-disposed double arms or brackets K K' K'', secured to said brake-beams at the center thereof.

At the longitudinal center of the truck there is secured to the truck-transom C' a pair of brackets L, extending rearwardly from the transom and having elongated openings 3. Between these brackets there is arranged a live-lever M, having a spindle 4, upon which revolve rollers 5, which engage the said openings 3 of the brackets, and within which openings the said rollers travel forward and backward, carrying with them the live-lever, and which also serves as a pivot upon which the said lever rotates during the action of applying and releasing the brakes, as will be more fully hereinafter explained.

A double hanger N, having a lower cross-rod 6, upon which revolves a roller 7, is suspended from the cross-beam F' and carries a connecting-bar O, consisting, preferably, of two side bars 8 9 and a spacing-bar 10, the three being riveted or bolted together, as shown at 11, and the center bar being shorter than the side bars to form a space 12 at each end thereof. This connecting-bar is arranged longitudinally of the truck between the spring-plank D' and the bolster B' and transom C', and it rides on the roller 7, the end toward the rear of the truck straddling the live-lever M and being pivotally connected thereto by the spindle 4, which passes through the side bars 8 and 9, its opposite end being pivoted at 13 to an equalizing-lever P, arranged within one of the spaces 12 and straddled by the side bars. The live-lever M and connecting-bar O are connected with the three brake-beams by means of rods Q, R, and S, which are pivoted at 15 to the brackets K K' K", which, as hereinbefore described, are attached thereto, and at 16 to the equalizing-lever P, the rod S being in two sections and passing through an opening in the hanger I', and being also provided with an ordinary turnbuckle T for shortening and lengthening the connection. To the upper end of the live-lever M there is pivoted at 17 one end of a rod U, the opposite end of which rod is pivotally connected at 18 to a fulcrum-lever V, forming a part of a system of body brake-operating rods and levers, such as are usually secured to the under side W of the car-body and, as indicated in Fig. 2, the rod 19 of which extends to the end of the car, where it may be connected to any of the well-known hand operating mechanism and the brakes operated thereby in the usual manner, or they may be operated by air from an air-cylinder, which is usually located equidistant from each end of the car. However, my invention does not contemplate the employment of any particular form or system of body brake-operating mechanism, and as it may be used in connection with any of the well-known forms I will not, therefore, further describe the same, but will now describe the operation of my improved brake mechanism.

When the brake-shoes are released, the live-lever and its connecting members assume the position shown in Fig. 1 and by solid lines in Fig. 2. Then when power is applied to the upper end of the live-lever it moves to the position shown by dotted lines at B', Fig. 2, and when in this position the rod Q is drawn forward and the brake-shoes are set against the two rear wheels of the truck, and the live-lever then travels to the position shown by dotted lines at C', Fig. 2, carrying with it the connecting-bar O and equalizing-lever P, which in turn through the rods R and S set the brake-shoes H' H" against the other two pairs of wheels, and these operations take place at both trucks of the car at the same time, whether the braking power is applied by hand at either end of the car or by air from the center thereof.

Various modifications may be made in details of construction without departing from the spirit of my invention, and I do not, therefore, wish to limit the same to the exact structural details shown and described.

Having thus fully described my invention, I claim—

1. In a brake mechanism for six-wheeled car-trucks, brackets carried by the truck-frame and having elongated openings therein, a live-lever carried by said brackets and pivotally mounted and movable forward and backward in said openings, an open hanger carried by the framework of the truck, a connecting-bar extending through said hanger and being pivotally connected to said live-lever and movable forward and backward therewith, in combination with brake-shoes arranged at each of the wheels of the truck, and means operatively connecting the said brake-shoes with said live-lever and said connecting-bar, substantially as set forth.

2. In a brake mechanism for six-wheeled car-trucks, brackets carried by the truck-frame and having elongated openings therein, a live-lever carried by said brackets and pivotally mounted and movable forward and backward in said openings, an open hanger carried by the framework of the truck, a connecting-bar extending through said hanger and being pivotally connected to said live-lever and movable forward and backward therewith, and brake-shoes arranged at each of the wheels of the truck, in combination with means operatively connecting the said brake-shoes with said live-lever and said connecting-bar, and a device connecting said live-lever with a system of rods and levers, whereby power may be applied to said live-lever and transmitted therethrough to set the brakes, substantially as set forth.

3. In a brake mechanism for six-wheeled car-trucks, a brake-beam arranged transversely of the truck at each pair of wheels, a brake-shoe connected to said beam at each end thereof and adapted to engage said wheels, brackets connected to said beam at the center thereof and which extend toward the wheel-axles, arms carried by the truck-timbers, hangers in pivotal connection with said arms and said brackets and whereby the said brake-beams are suspended from the truck-frame, brackets carried by the truck-frame and having elongated openings therein, a live-lever mounted in said brackets and being provided with a spindle upon which rollers are mounted and which rollers are adapted to travel in said openings, a hanger having a roller therein, and a connecting-bar one end of which is carried by and movable in said hanger on said roller its other end being in pivotal connection with said live-lever and adapted to travel therewith in said openings, in combination with means for connecting said live-lever and said connecting-bar with said brake-beams, and a rod connecting the said live-lever with a suitable system of rods and levers whereby power may be applied to said live-lever to set the brakes, substantially as set forth.

4. The combination with a six-wheeled car-truck, of brackets as L provided with openings as 3, a live-lever as M carried by said brackets and having a spindle 4, rollers 5 journaled on said spindle at each side of said live-lever, the said rollers engaging said openings and being adapted to travel to and fro therein, a connecting-bar as O pivotally connected to said live-lever and movable to and fro therewith, a hanger as N carrying one end of said connecting-bar and having a roller 7 upon which the same rides, brake-shoes arranged at each of the wheels of the truck, and means operatively connecting said brake-shoes with said live-lever and said connecting-bar, substantially as set forth.

5. The combination with a six-wheeled car-truck, of brackets as L provided with openings as 3, a live-lever as M carried by said brackets and having a spindle 4, rollers 5 journaled on said spindle at each side of said live-lever, the said rollers engaging said openings and being adapted to travel to and fro therein, a connecting-bar as O pivotally connected to said live-lever and movable to and fro therewith, a hanger as N carrying one end of said connecting-bar and having a roller 7 upon which the same rides, brake-shoes arranged at each of the wheels of the truck, means operatively connecting said brake-shoes with said live-lever and said connecting-bar, and a device for connecting said live-lever with a system of rods and levers whereby power may be applied to said live-lever and transmitted therethrough to set the brakes, substantially as set forth.

In testimony whereof I hereunto subscribe my name this 18th day of January, A. D. 1900.

HENRY TESSEYMAN.

Witnesses:
N. EMMONS, Jr.,
H. S. MILLER.